US009284912B2

(12) United States Patent
Takahashi et al.

(10) Patent No.: US 9,284,912 B2
(45) Date of Patent: Mar. 15, 2016

(54) COVER STRUCTURE OF PLUG HOLE

(71) Applicant: KAWASAKI JUKOGYO KABUSHIKI KAISHA, Hyogo (JP)

(72) Inventors: Keiji Takahashi, Akashi (JP); Yoko Yasui, Kobe (JP); Yuji Kouma, Takasago (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 124 days.

(21) Appl. No.: 13/974,484

(22) Filed: Aug. 23, 2013

(65) Prior Publication Data
US 2015/0053166 A1 Feb. 26, 2015

(51) Int. Cl.
F02F 1/42 (2006.01)
H01T 13/00 (2006.01)
F02F 11/00 (2006.01)

(52) U.S. Cl.
CPC ..................... F02F 11/002 (2013.01)

(58) Field of Classification Search
CPC ........... F02F 1/242; F02F 1/38; F02F 11/002; F02P 13/00; F02P 1/00; H01T 13/08; H01T 13/04
USPC ................ 123/193.5, 195 C, 169 R, 169 PH, 123/169 PA, 143 C
See application file for complete search history.

(56) References Cited

U.S. PATENT DOCUMENTS

| 4,986,233 A * | 1/1991 | Akagi | F02P 3/02 123/169 PA |
| 5,003,958 A * | 4/1991 | Yoneyama | F02P 3/02 123/193.5 |
| 5,628,298 A * | 5/1997 | Murata | F02P 3/02 123/143 C |
| 5,662,095 A * | 9/1997 | Matsuo | H01T 13/06 123/143 C |
| 5,878,706 A * | 3/1999 | Akamatsu | H01T 13/06 123/143 C |
| 2004/0173194 A1* | 9/2004 | Fuma | F02P 3/02 123/634 |
| 2007/0235013 A1* | 10/2007 | Maekawa | H01F 38/12 123/635 |

FOREIGN PATENT DOCUMENTS

| EP | 1990535 A2 * | 11/2008 | ............ F02P 3/02 |
| JP | 8-335488 | 12/1996 | |
| JP | 2002164145 A * | 6/2002 | |

* cited by examiner

Primary Examiner — Marguerite McMahon
Assistant Examiner — Tea Holbrook
(74) Attorney, Agent, or Firm — Wenderoth, Lind & Ponack, L.L.P.

(57) ABSTRACT

A cover structure of a plug hole provided to a cylinder head cover of an engine includes: a plug cap detachably attached to the plug hole; an outer cover covering at least an upper side of the plug cap; and a seal member provided on an upper face of the cylinder head cover and surrounding a periphery of the plug hole. In the cover structure, the outer cover has a projection portion projected toward the cylinder head cover, and the seal member is pressed to the upper face of the cylinder head cover by the projection portion.

12 Claims, 8 Drawing Sheets

COVER STRUCTURE OF PLUG HOLE

BACKGROUND OF THE INVENTION

1. Field of the Invention

The present invention relates to a cover structure that restrains rainwater or the like from entering into a plug hole provided to a cylinder head of an engine.

2. Description of the Related Art

Conventionally, it is known that a plug cap which is to be attached to a plug hole provided to a cylinder head cover has a rain cover and the rain cover restrains rainwater or the like from entering into the plug hole. Specifically, at the opening of the plug hole, the rain cover is fit to a projection portion provided at an outer circumferential edge of the opening of the plug hole. This restrains rainwater or the like from entering the plug hole. JP 8-335488 A is a prior art document.

Thus, in order to restrain rainwater or the like from entering the plug hole, it is necessary to form the plug cap such that the rain cover is located at the opening of the plug hole and also form a projection portion at an outer circumferential edge of the opening of the plug hole, in a state where the plug cap is attached to the plug hole.

However, the depth of the plug hole varies in each model and it is necessary to prepare plug caps having a rain cover which is set according to the depth of the plug hole of each model. Thus, number of different types of plug caps increases. Further, since it is necessary to form a projection portion at the outer circumferential edge of the opening of the plug hole, manufacturing a cylinder head cover is not easy. In other words, according to the conventional cover structure of the plug hole, since the number of types of plug caps increases and manufacturing the cylinder head cover is not easy, the cost of the cover structure of the plug hole increases.

SUMMARY OF THE INVENTION

The present invention has been made in view of the above problems, and an object thereof is to provide a cover structure of a plug hole that realizes a cost reduction.

In order to achieve the above object, the first aspect of the present invention provides a cover structure of a plug hole provided to a cylinder head cover of an engine, the cover structure including: a plug cap detachably attached to the plug hole; an outer cover covering at least an upper side of the plug cap; and a seal member provided on an upper face of the cylinder head cover and surrounding a periphery of the plug hole. In the cover structure, the outer cover has a projection portion projected toward the cylinder head cover, and the seal member is pressed to the upper face of the cylinder head cover by the projection portion.

According to the above configuration, the seal member provided around the plug hole, the outer cover covering at least the upper side of the plug cap, and the projection portion projecting from the outer cover toward the seal member can restrain water from entering into the plug hole from the upper side of the plug cap.

The cover structure of the plug hole preferably can employ the following configurations.

(1) The projection portion is a first projection portion, the outer cover further has a second projection portion located radially inside the first projection portion and projecting toward the cylinder head cover, the seal member has first and second convex portions respectively facing the first and second projection portions, the plug cap has a disk portion enlarged in a radial direction, the disk portion has a peripheral projection projecting downwardly at an outer circumferential edge thereof, and when the plug cap is attached to the plug hole, (a) the peripheral projection is inserted between the first convex portion and the second convex portion, (b) the first projection portion presses the first convex portion downwardly, and (c) the second projection portion is placed facing the second convex portion and substantially contacts with an upper face of the disk portion.

According to the configuration (1), a maze structure is formed around the plug hole by the first and second projection portions of the outer cover, and the peripheral projection and upper face of the disk portion. With this structure, a water entering route to the plug hole is made like a maze and this provides an effective water shielding. Further, since the second projection portion substantially contacts with the upper face of the disk portion, the plug cap is kept in the plug hole without being detached.

(2) With the configuration (1), a water discharging cut portion, which penetrates in the radial direction, is formed at the first convex portion.

According to the configuration (2), even when some water enters between the first convex portion and the second convex portion, the water can be discharged from the water discharging cut portion which is formed to the first convex portion to penetrate in a radial direction.

(3) With the configuration (2), the plug cap has a cable configured to be connectable to the ignition coil, and the cut portion is formed along an routing direction of the cable.

According to the configuration (3), when the plug cap is attached to the plug hole and the cable of the plug cap is placed along the cut portion, the cable can be properly routed in a shortest path. With this structure, the cable assemblability can be improved.

(4) With the configuration (3), the outer cover is formed with a cable outlet that pulls out the cable, the cable outlet is provided with a cable retainer that retains the cable, and the cable outlet is configured to have an opening that communicates the inside and the outside of the outer cover even when the cable retainer retains the cable.

According to the configuration (4), since the cable retainer can retain the cable, movements of the cable are restricted and an inference between the cable and the outer cover can be prevented. Further, the cable outlet has an opening that communicates inside and outside of the outer cover even in a state where the cable retainer retains the cable. With this structure, water entered into the outer cover is discharged from the outer cover via the opening.

(5) With the configuration (2), the second convex portion is formed with a communication path that communicates the plug hole with the radially outside of the second convex portion.

According to the configuration (5), the water entered into the plug hole is vaporized in the plug hole because of the high temperature of the engine and discharged from the plug hole via the communication path. After that the water vapor or water is discharged from the cut portion formed in the first convex portion. Further, because of the high temperature of the engine, even when the pressure in the plug hole rises, the pressure can be released outside the plug hole via the communication path. With this structure, it is prevented that the plug cap is come out due to the rise of the pressure in the plug hole.

(6) With the configuration (3), the engine is a multi-cylinder engine having a plurality of cylinders, the plug hole is provided respectively to the plurality of cylinders, and the plurality of seal members provided corresponding to the respective plug holes are connected via a connection portion.

According to the configuration (6), since the seal members provided to each cylinder are integrally formed, the seal members can be properly positioned to assemble. Namely, the seal members can be assembled as positioning the cut portions of the seal member along the cable routing direction set to each cylinder (or each plug hole). This structure can prevent assembling wrong parts and improve the assemblability of the seal member.

(7) With the configuration (6), a recess is provided to a lower face of the connection portion across the whole width of the connection portion.

According to the configuration (7), the recess extending across the whole width of the lower face of the connection portion prevents water from being held on the upper face of the cylinder head cover.

(8) With the configuration (7), a shape of the first projection portion corresponding to the connection portion is made in a liner shape substantially orthogonal to the connection portion.

According to the configuration (8), since the connection portion is not pressed by the first projection portion, the deformation of the connection portion can be prevented. Thus, since it is prevented that the connection portion is deformed and the recess is lost, the aspect of the invention described in the configuration (7) can be properly implemented.

(9) With the configuration (6), a cable guide face is formed on an outer circumferential face of at least one of the first projection portions, and the cable guide face is configured to position the cable in the outer cover.

According to the configuration (9), the cable routing in the outer cover can be guided by the cable guide face formed at the outer circumferential face of the first projection portion. With this structure, since the cable can be properly routed in the outer cover, interference among the cables one another or interference between the cables and the outer cover can be prevented.

The utility vehicle according to a second aspect of the present invention includes the cover structure according to the first aspect of the invention having the configuration (4), and a space in which the engine is installed is shielded by a shielding member on at least a front side thereof, and the cable outlet is provided at a front part of the outer cover.

According to the configuration, the space in which the engine is installed is shielded by the shielding member on at least the front side thereof and the cable outlet is provided at the front part of the engine. Thus, the front side which is a facing direction of the cable outlet is shielded by the shielding member. With this structure, the shielding member can restrain water from entering into the cable outlet from the front side while the vehicle is traveling.

In the utility vehicle, the ignition coil connected to the plug cap is preferably attached to a vehicle frame.

According to the configuration, the ignition coil is attached to the vehicle frame so that the vibration resistance and heat resistance requirement of the ignition coil can be eased, compared to the case the ignition coil is attached to the engine. With this structure, the cost of the ignition coil can be reduced.

BRIEF DESCRIPTION OF THE DRAWINGS

The object, features, and advantages of the present invention will become more apparent from the following detailed description when taken in conjunction with the accompanying drawings.

DETAILED DESCRIPTION OF THE INVENTION

Entire Configuration

FIGS. 1 to 8 illustrate a cover structure of a plug hole and a utility vehicle including the cover structure according to the present invention, and an embodiment of the present invention will be described with reference to these drawings. It is noted that, for the sake of convenience in description, the front-back direction of the vehicle is used as the front-back direction of the engine, the cover structure, and other components and, in the width direction of the vehicle, the right-left direction seen from a passenger accommodated in the vehicle (the right and left seen from the back of the vehicle) is used as the right-left direction of the vehicle, the engine, the cover structure, and other components, in the following description.

Figure 1:
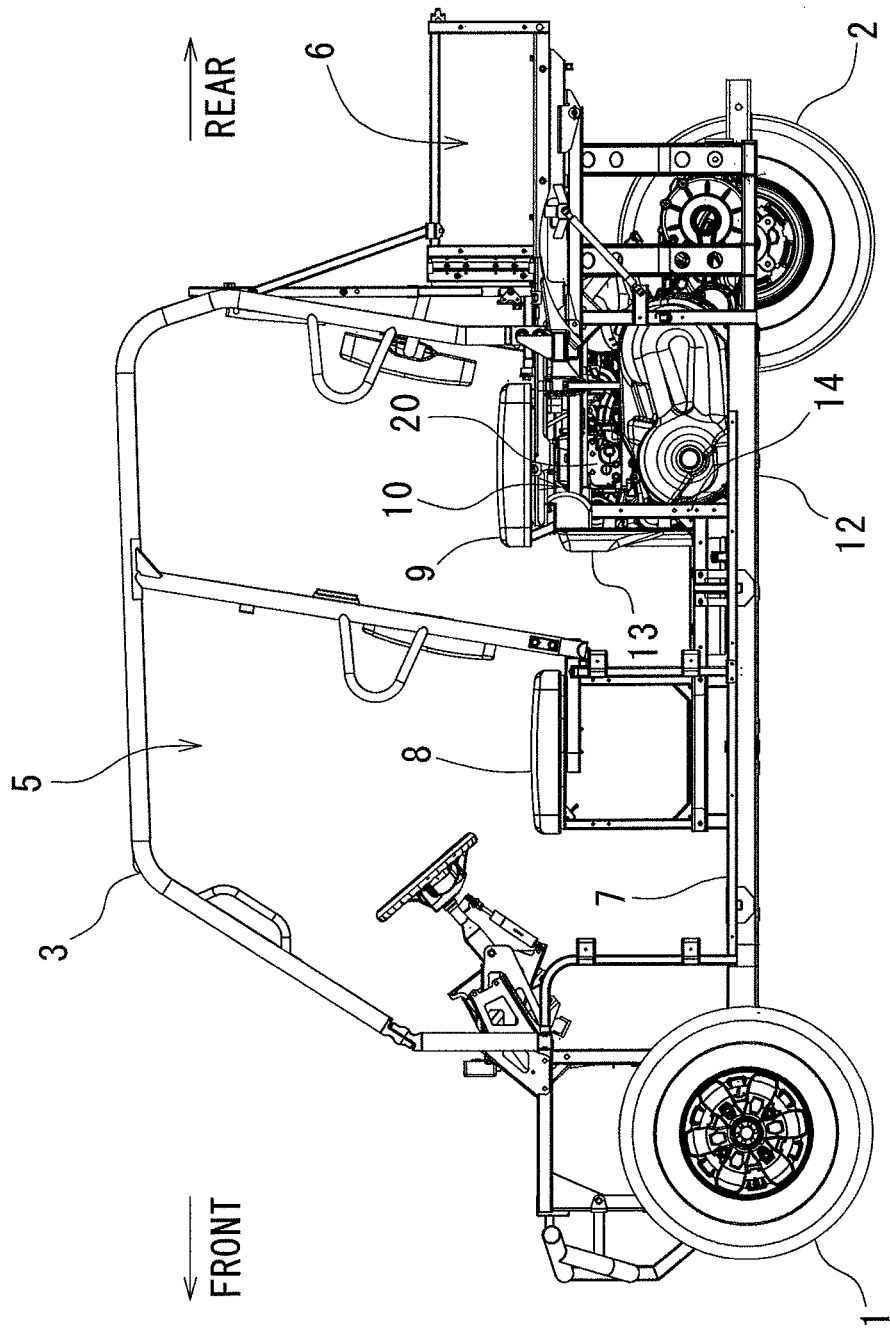
FIG. 1 is a left side view of a utility vehicle including an engine with a cover structure of a plug hole according to the present invention.

FIG. 1 is a left side view of the utility vehicle shown as a framework without an outer body structure member and a left rear wheel. As shown in FIG. 1, the utility vehicle has a pair of right and left front wheels 1 in a front part, and a pair of right and left rear wheels 2 in a rear part. A passenger compartment 5 framed by a ROPS 3 is located between the front wheels 1 and the rear wheels 2, and a luggage space 6 is located in back of the passenger compartment 5. The ROPS 3 is an abbreviation for "rollover protective structure."

In the passenger compartment 5, there is provided a floor panel 7 which forms a floor, a front seat 8, and a rear seat 9. Under the rear seat 9, there is an engine room 10 in which an engine 20 is accommodated. The engine room 10 is formed by the rear seat 9, an under cover 12 and a front wall (a shielding member) 13, being surrounded at least at its upper, front and lower sides.

The front wall 13 extends downward to connect a front end of the rear seat 9 with the floor panel 7 and has a structure that prevents rainwater or muddy water from road surfaces splashed by the front wheels 1 and/or the rear wheels 2 from entering into the engine room 10 from the front side of the vehicle.

(Engine Configuration)

Figure 2:
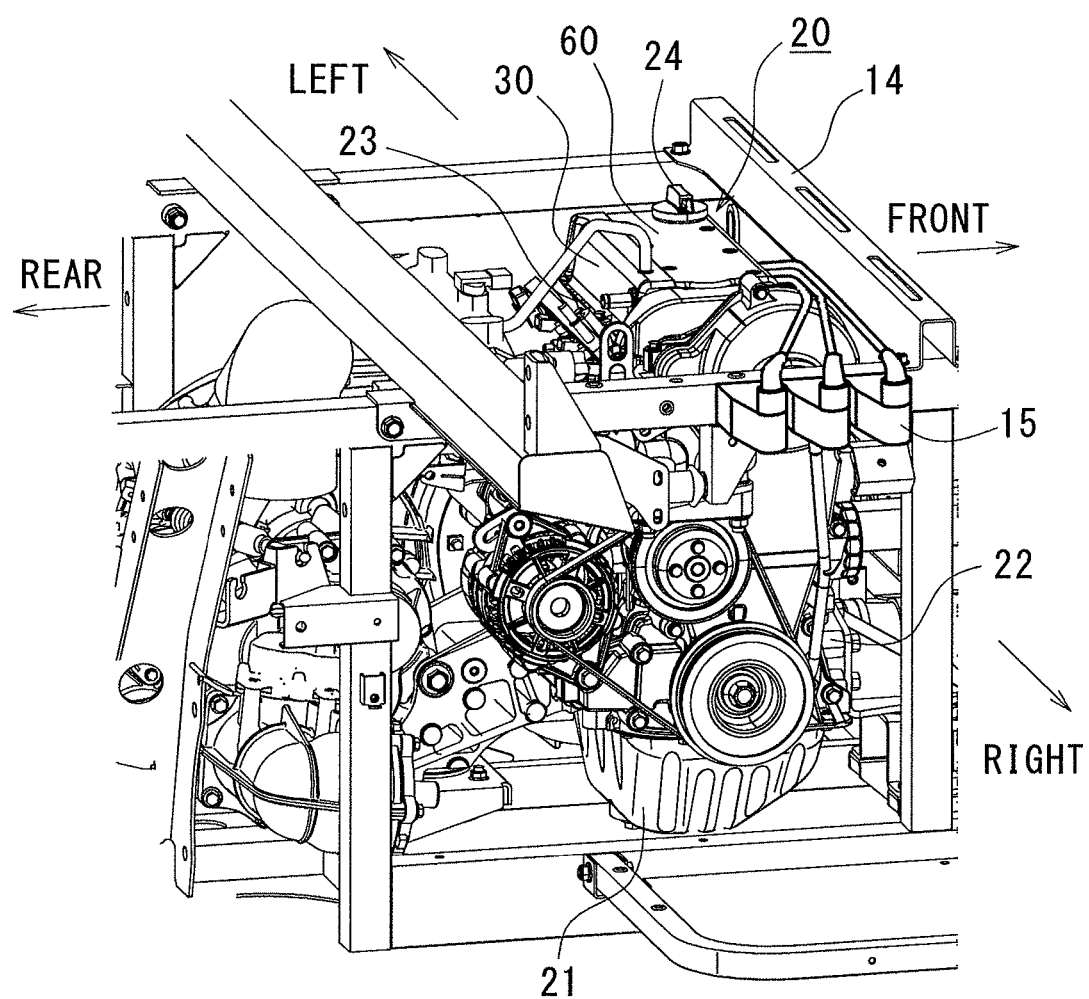
FIG. 2 is a perspective view of the engine of FIG. 1.
Figure 3:
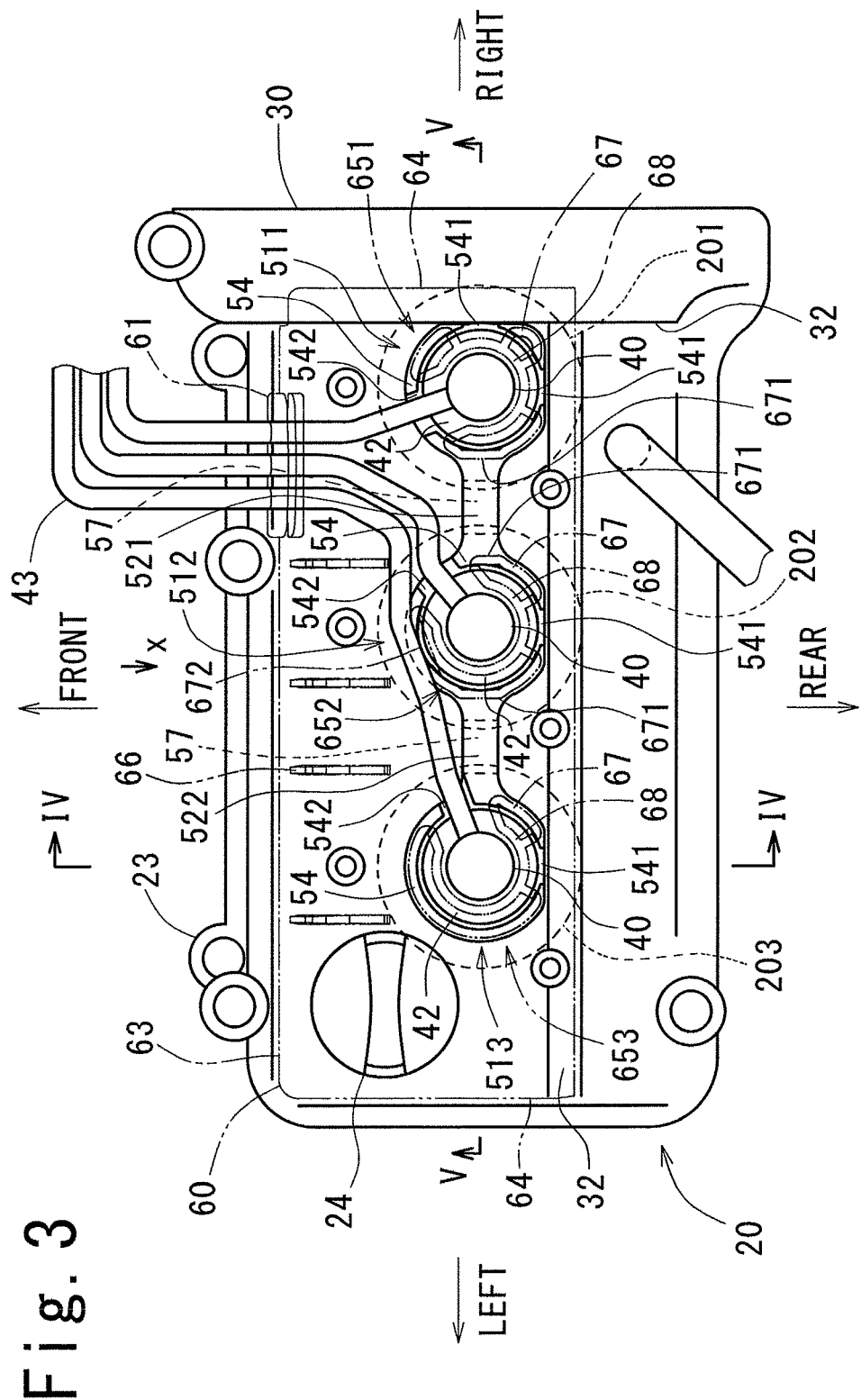
FIG. 3 is a plan view of the engine.

FIG. 2 is a perspective view illustrating the engine 20 mounted to a vehicle frame 14, and FIG. 3 is a plan view of the engine 20, illustrating around a cylinder head 23. Here, in FIG. 3, a later described outer cover 60 is shown with a dashed double-dotted line, and the inside of the outer cover 60 is illustrated transparently. As illustrated in FIGS. 2 and 3, the engine 20 is an inline-three-cylinder engine (also referred to as a parallel-three-cylinder engine) which has first to third cylinders 201 to 203 sequentially from the right and is mounted to the vehicle frame 14 via an engine mounting rubber (not illustrated) with the line of cylinders lying in the vehicle width direction. The engine 20 has a cylinder block 22 including the cylinders. Under the cylinder block 22, an oil pan 21 is attached and, above the cylinder block 22, the cylinder head 23 and a cylinder head cover 30 are attached sequentially. To the cylinder head cover 30, the outer cover 60 and an oil filler cap 24 are attached.

(Plug Hole Cover Structure)

Figure 4:
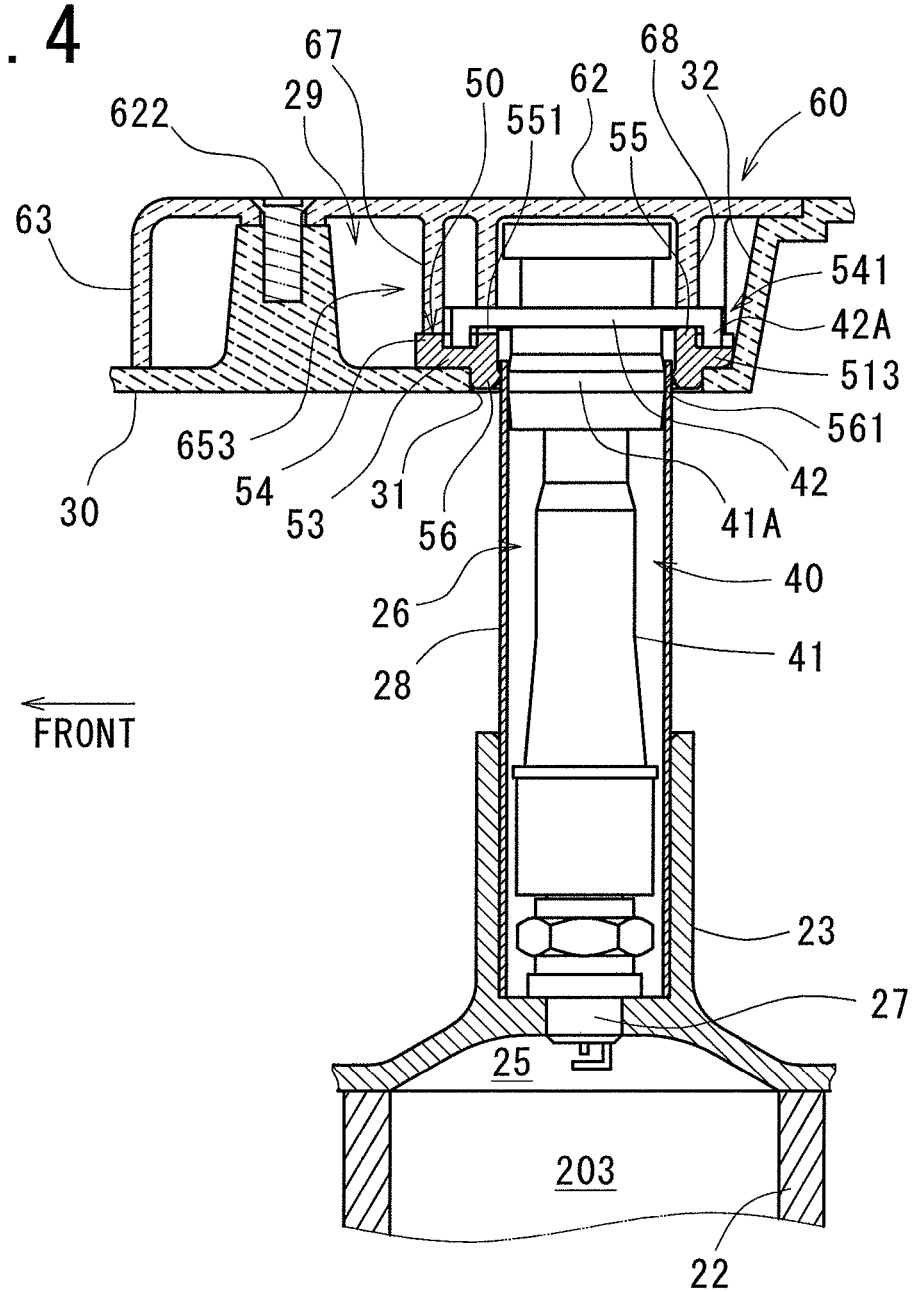
FIG. 4 is a sectional view taken along line IV-IV in FIG. 3.
Figure 5:
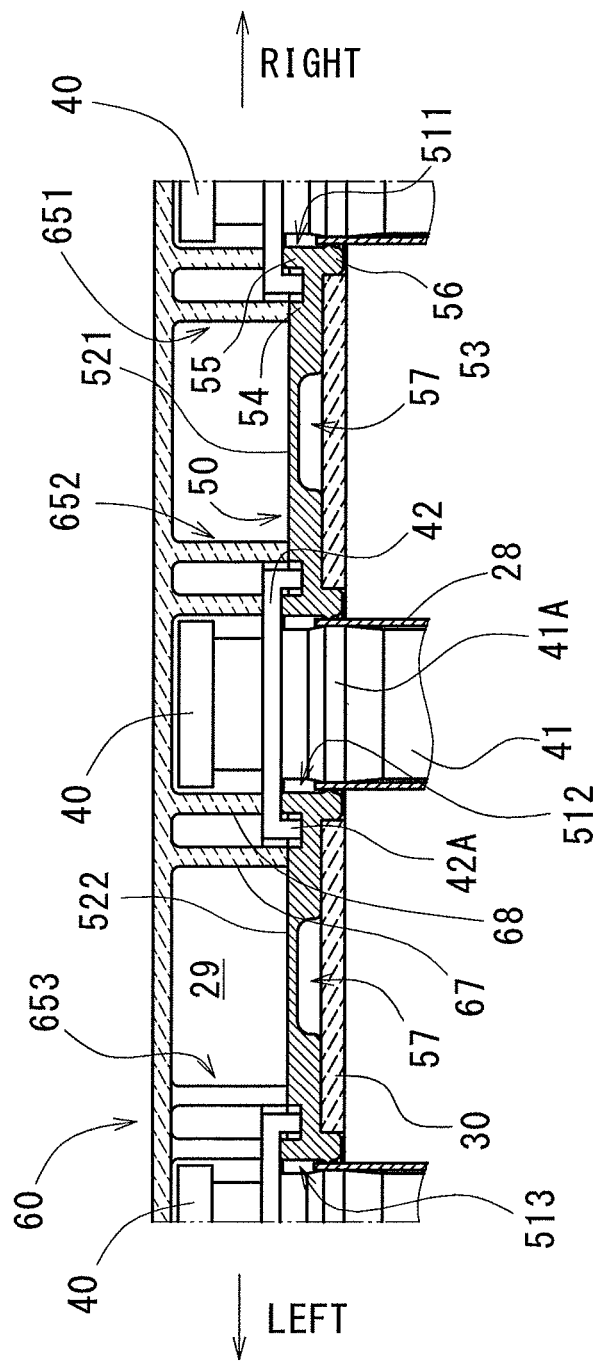
FIG. 5 is a sectional view taken along line V-V in FIG. 3.

FIG. 4 is a sectional view taken along line IV-IV in FIG. 3, and FIG. 5 is a sectional view taken along line V-V in FIG. 3. As illustrated in FIG. 4, above a combustion chamber 25 of the cylinder head 23, a plug hole 26 extending from the cylinder head 23 to the cylinder head cover 30 is formed. The plug hole 26 is a hole to mount a spark plug 27 and is formed as an inside diameter portion of a plug guide 28 attached to the cylinder head 23. The spark plug 27 is mounted in the plug hole 26 so as to place an end of its electrode in the combustion chamber 25. On the top of the spark plug 27, a plug cap 40 is attached. The plug guide 28 penetrates a plug opening 31 formed on an upper face of the cylinder head cover 30.

On the upper face of the cylinder head cover 30, a seal member 50 which is surrounding the plug guide 28 is provided. Between the outer cover 60 and the cylinder head cover 30, a plug cap accommodation room 29 is formed so as to surround the plug cap 40 projecting from the plug hole 26. The cylinder head cover 30, plug cap 40, seal member 50 and outer cover 60 constitute a cover structure of the plug hole 26.

(Configuration of Plug Cap 40)

As illustrated in FIG. 4, the plug cap 40 has a plug cap body 41 of a tubular shape which is insertable into and detachable from the plug hole 26 and made of an insulating material such as resin, a rain cover (disk portion) 42 extending in a radial direction above the plug hole 26, and a plug cable 43 (see FIG. 3). On the upper part of the plug cap body 41, a larger diameter portion 41A formed in a larger diameter in a radial direction is integrally formed. The larger diameter portion 41A substantially tightly contacts to an inner circumferential surface of the plug guide 28 so as to restrain rainwater or the like from entering into the plug hole 26.

On an outer circumferential end of the rain cover 42, a peripheral projection 42A which is projecting downwardly is integrally formed. As illustrated in FIG. 3, the plug cable 43 extends from an upper portion of the plug cap body 41 toward a later described cable retainer 61. As illustrated in FIG. 2, the other end of the plug cable 43 is connected to an ignition coil 15 attached to the vehicle frame 14.

(Configuration of Seal Member 50)

Figure 6:
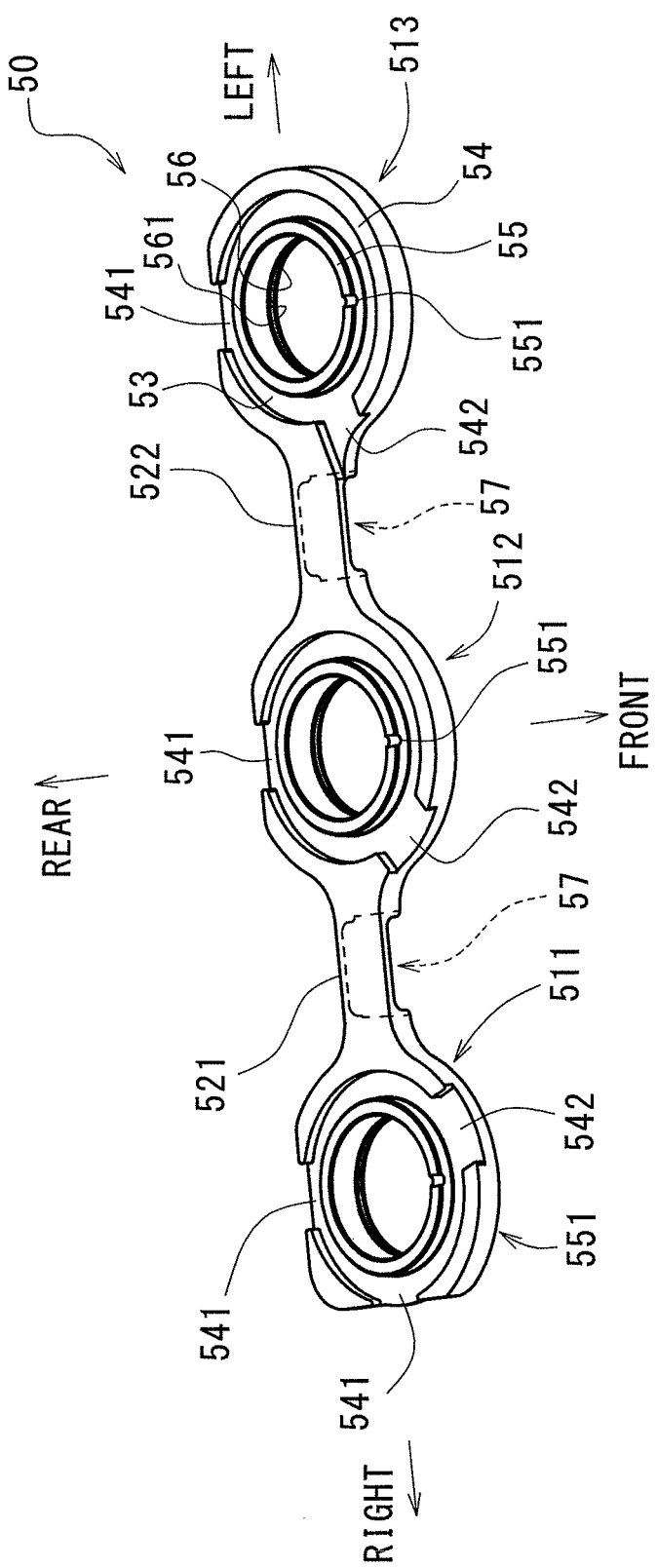
FIG. 6 is a perspective view of a seal member.

FIG. 6 is a perspective view of the seal member 50. As illustrated in FIG. 6, the seal member 50 is made of an elastic material such as rubber, and has first to third seal bodies 511 to 513, a first connection portion 521 connecting the first seal body 511 and the second seal body 512, and a second connection portion 522 connecting the second seal body 512 and the third seal body 513.

As illustrated in FIG. 3, the first seal body 511 is provided around the plug guide 28 (see FIG. 4) of the first cylinder 201. Similarly, the second and third seal bodies 512, 513 are respectively provided around the plug guides 28 (see FIG. 4) of the second and third cylinders 202 and 203. The configurations of the first to third seal bodies 511 to 513 will be described taking the third seal body 513 as an example.

As illustrated in FIG. 6, the third seal body 513 has a substantially ring-shaped base plate 53, a first convex portion 54 projecting upwardly from an outer circumferential end of the base plate 53, a second convex portion 55 projecting upwardly from an inner circumferential end of the base plate 53 and a third convex portion 56 projecting downwardly from the inner circumferential end.

The first convex portion 54 is formed with a first cut portion 541 to avoid interference with a wall portion 32 of the cylinder head cover 30 (see FIG. 4) and a second cut portion 542 along a routing direction of the plug cable 43 (see FIG. 3).

The second convex portion 55 is formed with a communication path 551 formed in the front-back direction which communicates the inside and the outside in the radial direction of the second convex portion 55. As illustrated in FIG. 4, when the seal member 50 is attached to the cylinder head cover 30, the second convex portion 55 substantially contacts on a lower face of the rain cover 42 of the plug cap 40.

The third convex portion 56 is configured to be inserted between the plug opening 31 and an outer circumferential portion of the plug guide 28. On an inner circumferential portion of the third convex portion 56, a reduced diameter portion 561 which is formed in a reduced diameter in a radial direction is integrally formed. The reduced diameter portion 561 substantially tightly contacts to the outer circumferential portion of the plug guide 28 so as to restrain rainwater or the like from entering between the third convex portion 56 and the plug guide 28.

Next, the configuration of the first and second connection portions 521 and 522 will be described taking the first connection portion 521 as an example. As illustrated in FIG. 6, on a lower face of the first connection portion 521, a recess 57 is formed across the whole width of the first connection portion 521. As illustrated in FIG. 3, the recess 57 is formed substantially in the middle between the first and second seal bodies 511 and 512 and is formed in a location not to overlap, in planar view, with the first convex portions 54 of the first and second seal bodies 511 and 512.

As illustrated in FIG. 5, each of the third convex portions 56 of the first to third seal bodies 511 to 513 is inserted between the outer circumferential portion of the plug guide 28 of the respective first to third cylinders 201 to 203 (see FIG. 3) and the respective plug openings 31, and, at the same time, the base plate 53 is made to substantially contact with the upper face of the cylinder head cover 30. This helps to position the seal member 50 on the cylinder head cover 30. As illustrated in FIG. 3, according to this configuration, when the seal member 50 is positioned and fixed on the cylinder head cover 30, the first cut portion 541 is made to be placed facing the wall portion 32 of the cylinder head cover 30 and, at the same time, the second cut portion 542 is made to be placed along the routing direction of the plug cable 43.

(Configuration of Outer Cover 60)

Figure 7:
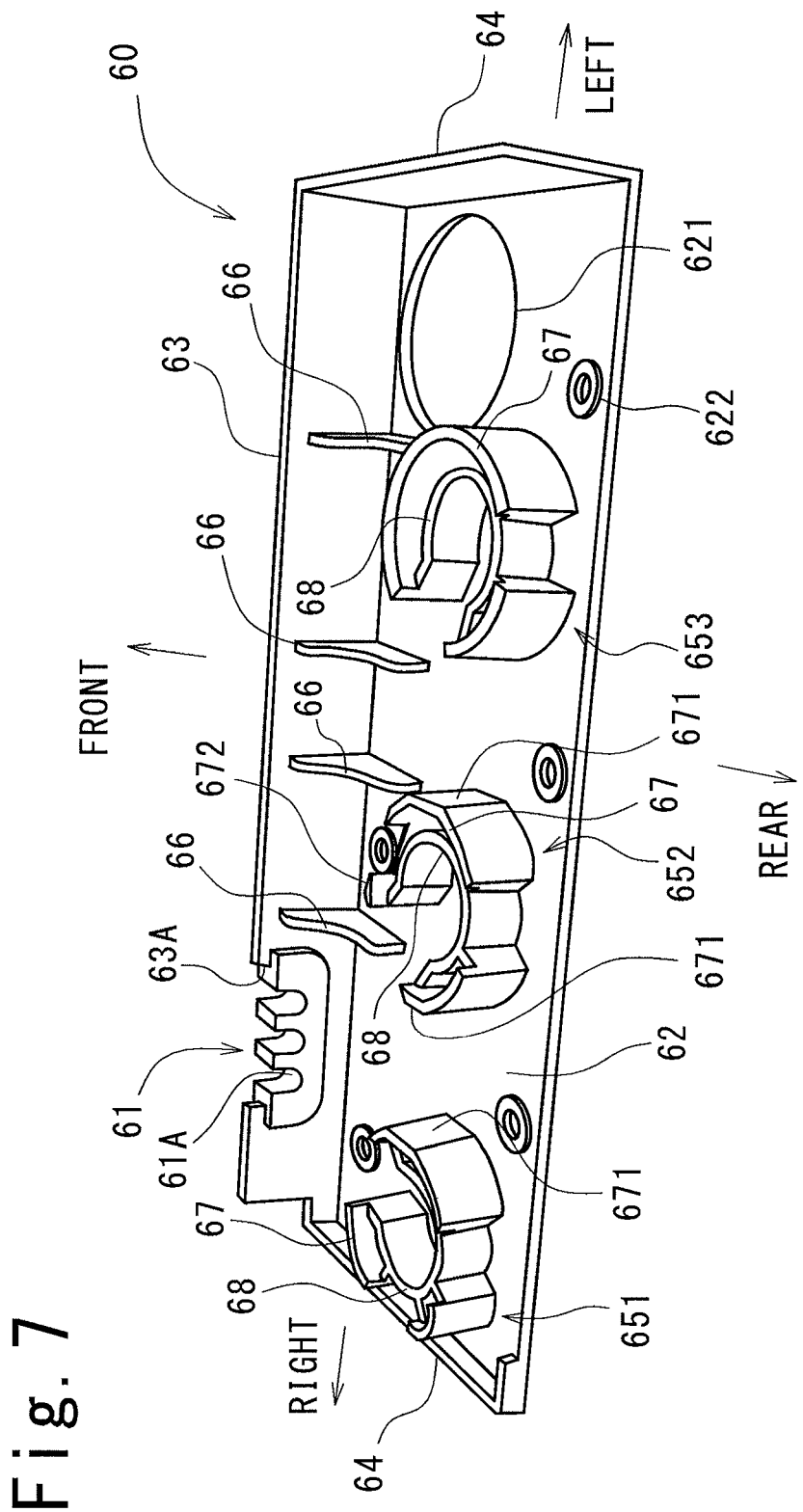
FIG. 7 is a perspective view of an outer cover.
Figure 8:
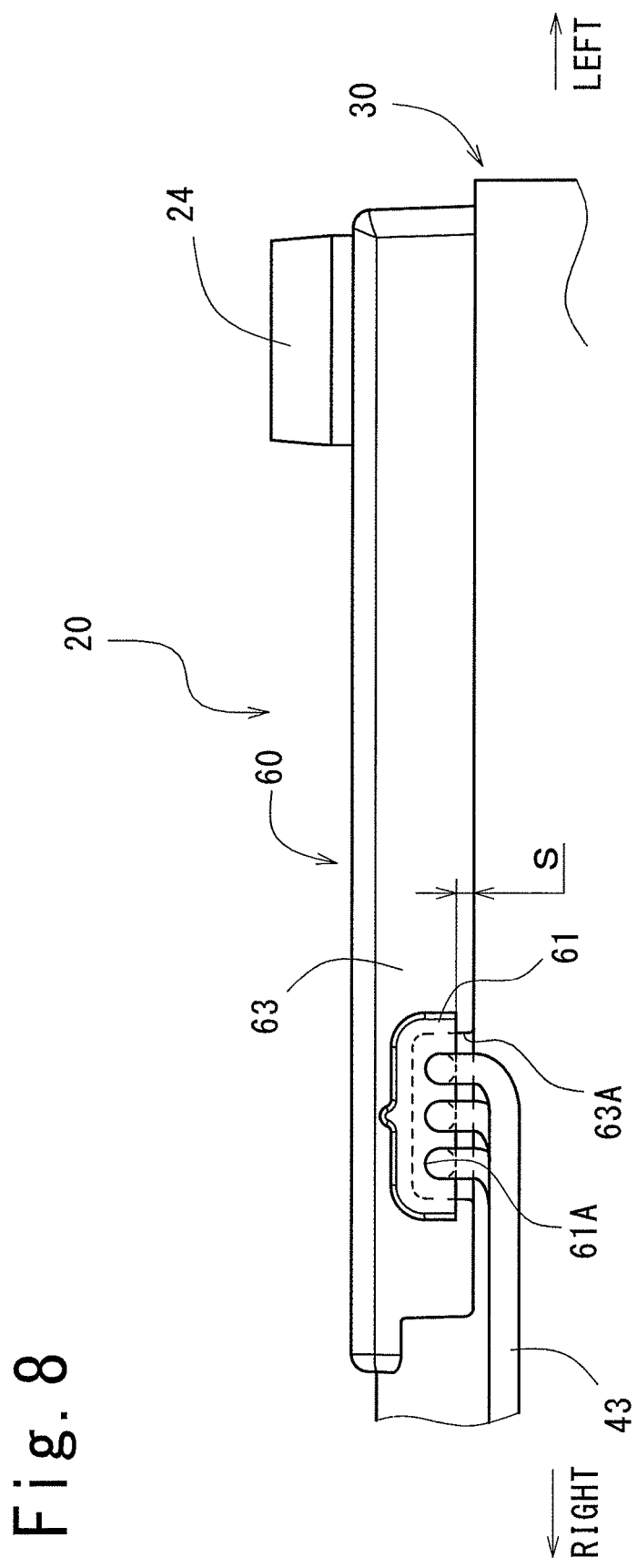
FIG. 8 is a front view of the engine seen from the direction indicated by an arrow x in FIG. 3.

FIG. 7 is a perspective view illustrating an inner side of the outer cover 60, and FIG. 8 is a front view of the engine 20 seen from the direction indicated by the arrow x in FIG. 3. As illustrated in FIG. 7, the outer cover 60 is made of a material with rigidity such as a resin material and includes a substantially rectangular-shaped top plate 62, a front wall 63 and a side wall 64 provided downwardly at a periphery of the top plate 62, and first to third projection bodies 651 to 653 respectively located corresponding to the first to third seal bodies 511 to 513 (see FIG. 3). As illustrated in FIG. 3, the periphery of the front wall 63 and the side wall 64 are configured to substantially contact with an upper portion of the cylinder head cover 30, and the plug cap accommodation room 29 (see FIG. 4) is formed between the outer cover 60 and the cylinder head cover 30.

As illustrated in FIG. 7, the top plate 62 is formed with an opening 621 used to attach the oil filler cap 24 (see FIG. 2) to the cylinder head cover 30 (see FIG. 2) and an attaching portion 622 used to attach the top plate 62 to the cylinder head cover 30 (see FIG. 2). Between the top plate 62 and the front wall 63, a plurality of reinforcing ribs 66 are integrally formed. The front wall 63 is formed with a cable outlet 63A which pulls out the plug cables 43 to outside of the outer cover 60, and a cable retainer 61 made of an elastic material is attached thereto.

As illustrated in FIG. 8, the cable retainer 61 has a substantially inverted U-shaped cut portion 61A which can retain the plug cables 43. In this structure, when the outer cover 60 is attached to the cylinder head cover 30 and the cable retainer 61 retains the plug cables 43, an opening S is formed between a lower face of the cable retainer 61 and an upper face of the cylinder head cover 30.

The configuration of the first to third projection bodies 651 to 653 will be described taking the third projection body 653 as an example. As illustrated in FIG. 7, the third projection body 653 has substantially circular-arc shaped first and second projecting portions 67, 68 which are projecting downwardly from the top plate 62. The first projection portion 67 is located radially outside the second projection portion 68.

As illustrated in FIG. 4, according to this configuration, when the plug cap 40, the seal member 50 and the outer cover 60 are attached to the cylinder head cover 30, the first projection portion 67 is placed facing the first convex portion 54 of the third seal body 513 to press the first convex portion 54 toward the cylinder head cover 30. On the other hand, the second projection portion 68 is placed facing the second convex portion 55 of the third seal body 513 and substantially contacts with an upper surface of the rain cover 42 of the plug cap 40. Between the first projection portion 67 and the second projection portion 68, the peripheral projection 42A of the rain cover 42 of the plug cap 40 is inserted.

In other words, a seal structure is formed between the first projection portion 67 and the first convex portion 54 and, in the radially inside of the seal structure, a maze structure is formed around the plug hole 26 by the first and second projection portions 67 and 68 of the outer cover 60, the first and second convex portions 54 and 55 of the seal member 50, and the rain cover 42 of the plug cap 40.

Further, as illustrated in FIG. 3, the first projection portion 67 is located so as to keep out of the first and second cut portions 541 and 542 of the first convex portion 54, and the second projection portion 68 is located so as to keep out of the second cut portion 542 of the first convex portion 54.

As illustrated in FIG. 7, the first projection portions 67 of the first and second projection bodies 651 and 652 are further formed with first straight portions 671. The first straight portions 671 are located at a radially inner side of the circular-arc base shape of a left side portion of the first projection body 651 and right side portion and left side portion of the second projection body 652, and formed substantially parallel to the front-back direction.

The first projection portion 67 of the second projection body 652 is further formed with a second straight portion 672 (cable guide face). As illustrated in FIG. 3, the second straight portion 672 is formed so that the plug cable 43 extending from the plug cap 40 attached to the plug hole 26 (see FIG. 4) of the third cylinder 203 is guided toward the cable retainer 61 without interfering with the reinforcing ribs 66 in the outer cover 60.

(Operation of the Cover Structure of the Plug Hole)

Reference to FIG. 1, rainwater or muddy water from road surfaces splashed by the front wheels 1 and/or rear wheels 2 is spattered over the cylinder head cover 30 of the engine 20. After that, referring to FIG. 4, although most of the rainwater runs on the upper face of the cylinder head cover 30 and falls downwardly from the engine 20, a small amount of the rainwater can enter the plug cap accommodation room 29 through a gap between the cylinder head cover 30 and the outer cover 60.

The rainwater that has entered the plug cap accommodation room 29 is firstly intercepted entering the plug hole 26 by the seal structure formed by the first projection portion 67 of the outer cover 60 and the first convex portion 54 of the seal member 50. Even if a quite small part of the rainwater goes though the seal structure, the maze structure formed in the radially inner side of the outer cover 60 restrains the rainwater from entering the plug hole 26.

Further, although the possibility is lower, by any chance, even when some rainwater or the like passes through the maze structure, since the seal structure and the maze structure prevents most of the rainwater from entering though, the amount of rainwater entering the plug hole 26 is an extremely small amount, and a sealing part formed between the larger diameter portion 41A formed on the plug cap 40 and the inner circumferential face of the plug guide 28 can restrain the rainwater from entering a deeper area in the plug hole 26. Then, because of a high temperature during an engine operation, the rainwater is vaporized and discharged between the first convex portion 54 and the second convex portion 55 via the communication path 551 formed in the second convex portion 55.

Then, the rainwater discharged between the first convex portion 54 and the second convex portion 55 is discharged outside of the first convex portion 54 via the first and second cut portions 541 and 542 formed in the first convex portion 54. Eventually, the rainwater entered into the outer cover 60 is discharged from the opening S (see FIG. 8) formed between the cable retainer 61 provided to the front wall 63 and the cylinder head cover 30 to the outside of the plug cap accommodation room 29.

Further, referring to FIG. 5, some rainwater which runs on the wall portion 32 from the rear part of the cylinder head cover 30 in the plug cap accommodation room 29 and enters in the back side of the first and second connection portions 521 and 522 of the seal member 50 is not held by the first and second connection portions 521 and 522 but discharged to the front side via the recess 57 formed on the lower face of the first and second connection portions 521 and 522.

Effect of the Embodiment (1) The first to third seal bodies 511 to 513 having the first convex portion 54 at their outer circumferential ends and the outer cover 60 that has the first projection portion 67 pressing the first convex portion 54 toward the cylinder head cover 30 and covers the upper side of the plug cap 40 are placed around the opening of the plug hole 26. This provides a cover structure, around the plug hole 26, that efficiently restrains rainwater or the like from entering through. In other words, the top plate 62 of the outer cover 60 can restrain rainwater or the like from entering the plug hole 26 from the upper side while the seal structure formed by the first convex portion 54 and the first projection portion 67 can restrain rainwater or the like from entering the plug hole 26 from the side.

(2) Since the second convex portion 55 is provided radially inside the first convex portion 54, the peripheral projection 42A of the rain cover 42 is inserted between the first convex portion 54 and the second convex portion 55, and the second projection portion 68 that substantially contacts with the upper face of the rain cover 42 is provided, a maze structure can be formed radially inside the seal structure. With this structure, even when rainwater or the like goes through the seal structure, since a route to the plug hole 26 is made like a maze, the rainwater or the like is kept out from the plug hole 26. Further, since the second projection portion 68 substantially contacts with the upper face of the rain cover 42, the plug cap 40 is kept attached to the plug hole 26.

(3) Since the first convex portion 54 is formed with the first and second cut portions 541 and 542, even when rainwater or the like enters between the first convex portion 54 and the second convex portion 55, the rainwater or the like can be discharged to the outside of the first convex portion 54 via the first and second cut portions 541 and 542.

(4) Since the second cut portion 542 is formed along the routing direction of the plug cable 43 of the plug cap 40, when the plug cap 40 is attached to the plug hole 26, the plug cable 43 of the plug cap 40 is easily routed by placing the plug cable 43 along the second cut portion 542. This improves the assemblability of the plug cap 40.

(5) Since the cable retainer 61 is provided to the outer cover 60, the cable retainer 61 can retain the plug cable 43. Because of this structure, the movement of the plug cable 43 in the outer cover 60 is restricted and interference among the plug cables 43 or interference between the plug cable 43 and the outer cover 60 can be prevented. Further, even in a state where the plug cable 43 is retained in the cable retainer 61, since the cable retainer 61 is formed with an opening S that communicates the inside and the outside of the outer cover 60, rainwater or the like entered the outer cover 60 can be discharged to outside of the outer cover 60 via the opening S.

(6) Since the communication path 551 is formed to the second convex portion 55, even when rainwater or the like enters the plug hole 26, the rainwater is vaporized because of a high temperature in the plug hole 26 while the engine 20 is operating and discharged between the first convex portion 54 and the second convex portion 55 via the communication path 551. After that, as described above, the rainwater is discharged outside the first convex portion 54 via the first and second cut portion 541 and 542. Further, even when the pressure in the plug hole 26 rises since the pressure is released to the outside of the plug hole 26 via the communication path 551, the plug cap 40 can be kept attached.

(7) Since the first to third seal bodies 511 to 513 provided to the respective cylinders are connected by the first and second connection portions 521 and 522, the assemblability of the seal member 50 can be improved. In other words, when the first to third seal bodies 511 to 533 are formed as separate members, it takes a lot of trouble to attach the first to third seal bodies 511 to 513 to the respective cylinders correspondingly as placing the location of the first cut portion 541 corresponding to the location of the wall portion 32 of the cylinder head cover 30 and placing the second cut portion 542 along the routing direction of the plug cable 43. Further, since the routing direction of the plug cables 43 differs in the respective cylinders, the first to third seal bodies 511 to 513 are made in shapes dedicated to the respective cylinders and there is a possibility that wrong parts are assembled. Thus, since the first to third seal bodies 511 to 513 are made integrally, wrong parts cannot be assembled and it is easier to place the respective seal bodies 511 to 513 corresponding to the locations of the first and second cut portions 541 and 542. This improves the assemblability of the seal member 50.

(8) Since the recesses 57 are formed on the lower face of the first and second connection portions 521 and 522 across the whole width of the connection portions 521 and 522, rainwater or the like splattered on the upper face of the cylinder head cover 30 is not held by the connection portions 521 and 522. With this structure, it is restrained that the rainwater or the like stays above the cylinder head cover 30 and that the rainwater or the like enters into the plug hole 26.

(9) The shapes of the portion located corresponding to the first and second connection portions 521 and 522 of the first projection portion 67 are formed as the first straight portions 671 that are substantially parallel to the front-back direction and placed in the radically inner side with respect to the basic shape of the first projection portion 67 having a substantially circular-arc shape. With this structure, the first projection portion 67 and the recess 57 are located not to correspond to each other and it is prevented that the recess 57 is pressed and deformed by the first projection portion 67. In other words, the recess 57 can preferably prevent rainwater or the like from being held.

(10) Since the second straight portion 672 that guides routing of the plug cable 43 in the outer cover 60 is formed to the first projection portion 67, the plug cable 43 of the plug cap 40 can be preferably routed in the outer cover 60. With this structure, interference among the plug cables 43 with each other in the outer cover 60 or interference between the plug cable 43 and the outer cover 60 can be prevented.

(11) The space in which the engine 20 is installed is covered by the front wall 13 on at least the front side, and the front wall 63 of the outer cover 60, that is, the cable retainer 61 is provided in the front part of the engine 20. In other words, the front side to which the cable retainer 61 is facing is covered by the front wall 13. With this structure, since the front wall 13 restrains water from splashed to the cable retainer 61 from the front side while the vehicle is traveling, it is restrained that water enters the plug cap accommodation room 29 via the opening S formed under the cable retainer 61.

(12) Since the ignition coil 15 is attached to the vehicle frame 14, an input of vibration from the engine 20 to the ignition coil 15 and influence of heat radiated from the engine 20 to the ignition coil 15 can be reduced, compared to the case of attaching the ignition coil 15 to the engine 20. This helps to ease requirements of vibration resistance and heat resistance of the ignition coil 15 so that the cost of the ignition coil 15 can be reduced.

The present invention is not limited to the above embodiment and various modifications may be made without departing from the scope of the present invention.

What is claimed is:

1. A cover structure of a plug hole of a cylinder head cover of an engine, the cover structure comprising:
   a plug cap detachably attached to the plug hole;
   an outer cover covering at least an upper surface of the plug cap; and
   a seal member provided on an upper surface of the cylinder head cover and surrounding a periphery of the plug hole,
   wherein the outer cover has a projection portion projected toward the cylinder head cover,
   wherein the seal member is pressed to the upper surface of the cylinder head cover by the projection portion;
   wherein the projection portion is a first projection portion,
   wherein the outer cover further has a second projection portion located radially inside the first projection portion and projecting toward the cylinder head cover,
   wherein the seal member has a first convex portion and a second convex portion respectively facing the first projection portion and the second projection portion,
   wherein the plug cap has a disk portion enlarged in a radial direction,
   wherein the disk portion has a peripheral projection projecting downwardly at an outer circumferential edge thereof, and
   wherein the outer cover, the plug cap, and the seal member are configured such that, when the plug cap is attached to the plug hole:
   (a) the peripheral projection is inserted between the first convex portion and the second convex portion,
   (b) the first projection portion presses the first convex portion downwardly, and (c) the second projection portion faces the second convex portion and substantially contacts with an upper surface of the disk portion.

2. The cover structure of the plug hole according to claim 1, wherein
a water discharging cut portion is formed at the first convex portion of the seal member so as to penetrate in a radial direction.

3. The cover structure of the plug hole, according to claim 2, wherein
the plug cap has a cable configured to be connectable to the ignition coil, and
the cut portion is formed along a routing direction of the cable.

4. The cover structure of the plug hole according to claim 3, wherein
the outer cover is formed with a cable outlet for allowing the cable to be pulled out,
the cable outlet is provided with a cable retainer that retains the cable, and
the cable outlet is configured to have an opening that allows communication between an inside and an outside of the outer cover even when the cable retainer retains the cable.

5. The cover structure of the plug hole according to claim 3, wherein
the engine is a multi-cylinder engine having a plurality of cylinders,
the plug hole is one of a plurality of plug holes each being provided for a respective one of the plurality of cylinders, and
the seal member is one of a plurality of seal members each corresponding to a respective one of the plug holes, the seal members being connected via a connection portion.

6. The cover structure of the plug hole according to claim 5, wherein
a lower face of the connection portion has a recess across a whole width of the connection portion.

7. The cover structure of the plug hole according to claim 6, wherein
a shape of the first projection portion corresponding to the connection portion has a linear shape substantially orthogonal to the connection portion.

8. The cover structure of the plug hole according to claim 5, wherein the first projection portion is one of a plurality of first projection portions,
a cable guide face is formed on an outer circumferential surface of at least one of the first projection portions, and
the cable guide face is configured to position the cable in the outer cover.

9. A utility vehicle comprising an engine including the cover structure of the plug hole according to claim 4, wherein
a space in which the engine is installed is shielded by a shielding member on at least a front side of the space, and the cable outlet is provided at a front part of the outer cover.

10. The utility vehicle according to claim 9, wherein
the ignition coil connected to the plug cap is attached to a vehicle frame.

11. The cover structure of the plug hole according to claim 2, wherein
the second convex portion is formed with a communication path that allows the plug hole to communicate with the radially-located outside of the second convex portion.

12. The cover structure of the plug hole according to claim 1, wherein the plug cap has a rain cover at an end thereof, the outer cover covering the rain cover of the plug cap such that an inner surface of the outer cover faces an outer surface of the rain cover.

* * * * *